United States Patent
Watkins et al.

(10) Patent No.: US 6,661,603 B1
(45) Date of Patent: Dec. 9, 2003

(54) DISK DRIVE INCLUDING CONDUCTIVE PATH BETWEEN DISK DRIVE BASE AND COVER THROUGH FASTENER SUPPORT

(75) Inventors: Norman K. Watkins, Morgan Hills, CA (US); Wayne M. Yamada, San Jose, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 103 days.

(21) Appl. No.: 09/967,572

(22) Filed: Sep. 28, 2001

(51) Int. Cl.[7] .............................................. G11B 17/02
(52) U.S. Cl. ................................................... 360/97.01
(58) Field of Search ........................... 360/97.01–99.12, 360/128

(56) References Cited

U.S. PATENT DOCUMENTS 4,363,056 A * 12/1982 Riggle et al. ............ 360/97.01
6,512,654 B2 * 1/2003 Teshima .................. 360/99.08

* cited by examiner

Primary Examiner—Robert S. Tupper
(74) Attorney, Agent, or Firm—Won Tae C. Kim, Esq.; Milad G. Shara, Esq.; Stetina Brunda Garred & Brucker

(57) ABSTRACT

A disk drive includes a disk drive base and a cover including a cover outer surface and a fastener opening disposed through the cover. The disk drive further includes an electrically insulative coating disposed upon the cover outer surface. The disk drive further includes a fastener that includes a fastener head and a fastener shaft. The disk drive further includes a fastener support disposed adjacent to the fastener opening. The fastener support includes a top surface for engaging the fastener head. The fastener support includes a central opening sized and configured to receive the fastener shaft through the central opening for mechanically coupling the cover and the disk drive base. The disk drive further includes a conductive path disposed between the disk drive base and the cover. The conductive path includes the fastener and the fastener support.

10 Claims, 4 Drawing Sheets

DISK DRIVE INCLUDING CONDUCTIVE PATH BETWEEN DISK DRIVE BASE AND COVER THROUGH FASTENER SUPPORT

CROSS-REFERENCE TO RELATED APPLICATION

Not applicable.

BACKGROUND OF THE INVENTION

1. Field of the Invention

The present invention relates generally to a disk drive having a conductive path between a disk drive base and a cover through a fastener support.

2. Description of the Prior Art

The typical hard disk drive includes a head disk assembly (HDA) and a printed circuit board assembly (PCBA) attached to a disk drive base of the HDA. The head disk assembly includes at least one magnetic disk, a spindle motor for rotating the disk, and a head stack assembly (HSA). The spindle motor includes a spindle motor hub that is rotatably attached to the disk drive base. The hub has an outer hub flange that supports a lowermost one of the disks. Additional disks may be stacked and separated with annular disk spacers that are disposed about the hub. The head stack assembly has an actuator assembly having at least one transducer head, typically several, for reading and writing data to and from the disk. The printed circuit board assembly includes a servo control system in the form of a disk controller for generating servo control signals. The head stack assembly is controllably positioned in response to the generated servo control signals from the disk controller. In so doing, the attached heads are moved relative to tracks disposed upon the disk.

The head stack assembly includes an actuator assembly, at least one head gimbal assembly, and a flex circuit cable assembly. A conventional "rotary" or "swing-type" actuator assembly typically comprises an actuator body that rotates on a pivot assembly between limited positions, a coil portion that extends from one side of the actuator body to interact with one or more permanent magnets to form a voice coil motor, and one or more actuator arms which that extend from an opposite side of the actuator body. A head gimbal assembly includes a head which is distally attached to each of the actuator arms. The actuator assembly includes the actuator body that has a bore and a pivot bearing cartridge engaged within the bore. The head gimbal assembly and the flex circuit cable assembly are attached to the actuator assembly.

A variety of fasteners, such a metal screws, are disposed about the cover for attachment of the cover with the disk drive base. A plurality of fasteners is disposed about a periphery of the cover and engages the periphery of the disk drive base. Typically, a fastener is engaged to the pivot bearing cartridge through the cover, and another fastener is engaged to the spindle motor also through the cover.

For any number of reasons, it may be desirable to provide a coating, such as E-coating, about the surface of the cover. For example, the coating may be utilized as a corrosion barrier for protecting the cover. Unfortunately, such a coating may give rise to problems associated with contamination within the disk drive. In this regard, during installation of the fasteners to such a coated cover, the fastener may abrasively contact the surface of the coating thereby producing particulates that tend to contaminate the interior of the disk drive.

Another problem that is introduced with the application of such a coating upon the cover is that the coated cover may become electrically insulated from other portions of the disk drive, because the coating tends to be electrically insulative in nature. In the absence of the coating, the cover is typically in direct contact with the disk drive base thereby grounding the cover. On the coated cover, however, a static electric charge may be built up on the surface of the coated cover. Unless removed, this static electric charge creates a high voltage potential between the cover and the other portions of the disk drive that may discharge to any number of the components within the disk drive, such as the transducers. Such a discharge may damage the disk drive components.

Accordingly, there is a need in the art for an improved attachment arrangement of the disk drive base and the cover in comparison to the prior art.

SUMMARY OF THE INVENTION

An aspect of the invention can be regarded as a disk drive that includes a disk drive base and a cover including a cover outer surface and a fastener opening disposed through the cover. The disk drive further includes an electrically insulative coating disposed upon the cover outer surface. The disk drive further includes a fastener that includes a fastener head and a fastener shaft. The disk drive further includes a fastener support disposed adjacent to the fastener opening. The fastener support includes a top surface for engaging the fastener head. The fastener support includes a central opening sized and configured to receive the fastener shaft through the central opening for mechanically coupling the cover and the disk drive base. The disk drive further includes a conductive path disposed between the disk drive base and the cover. The conductive path includes the fastener and the fastener support.

According to an embodiment of the present invention, the fastener support takes the form of a washer. The washer includes a bottom surface and the bottom surface is disposed upon the cover. The bottom surface may be attached to the cover with an electrically conductive adhesive. Alternatively, the washer may be soldered or brazed to the cover for example.

According to another embodiment of the present invention, the fastener support takes the form of a swage nut. The swage nut includes a barrel and a flange extending from the barrel. The flange includes a bottom surface disposed opposite the top surface adjacent the cover. Further, the barrel may include a protrusion for engaging the cover within the fastener opening. Where the cover is formed of multiple layers, the conductive path may include the protrusion and the multiple layers.

The cover is formed of cold rolled steel. The cover may be formed of multiple layers of cold rolled steel and the conductive path may include the multiple layers of cold rolled steel. In addition, it is contemplated that there are a variety of fasteners that may be disposed about the cover for attachment of the cover and the disk drive base. In this regard, the fastener may directly engage with the disk drive base. Further, the fastener may be engaged to a pivot bearing cartridge within the disk drive for mechanically coupling the cover and the disk drive base, or the fastener may be engaged to a spindle motor within the disk drive for mechanically coupling the cover and the disk drive base.

DESCRIPTION OF THE PREFERRED EMBODIMENTS

Figure 1:
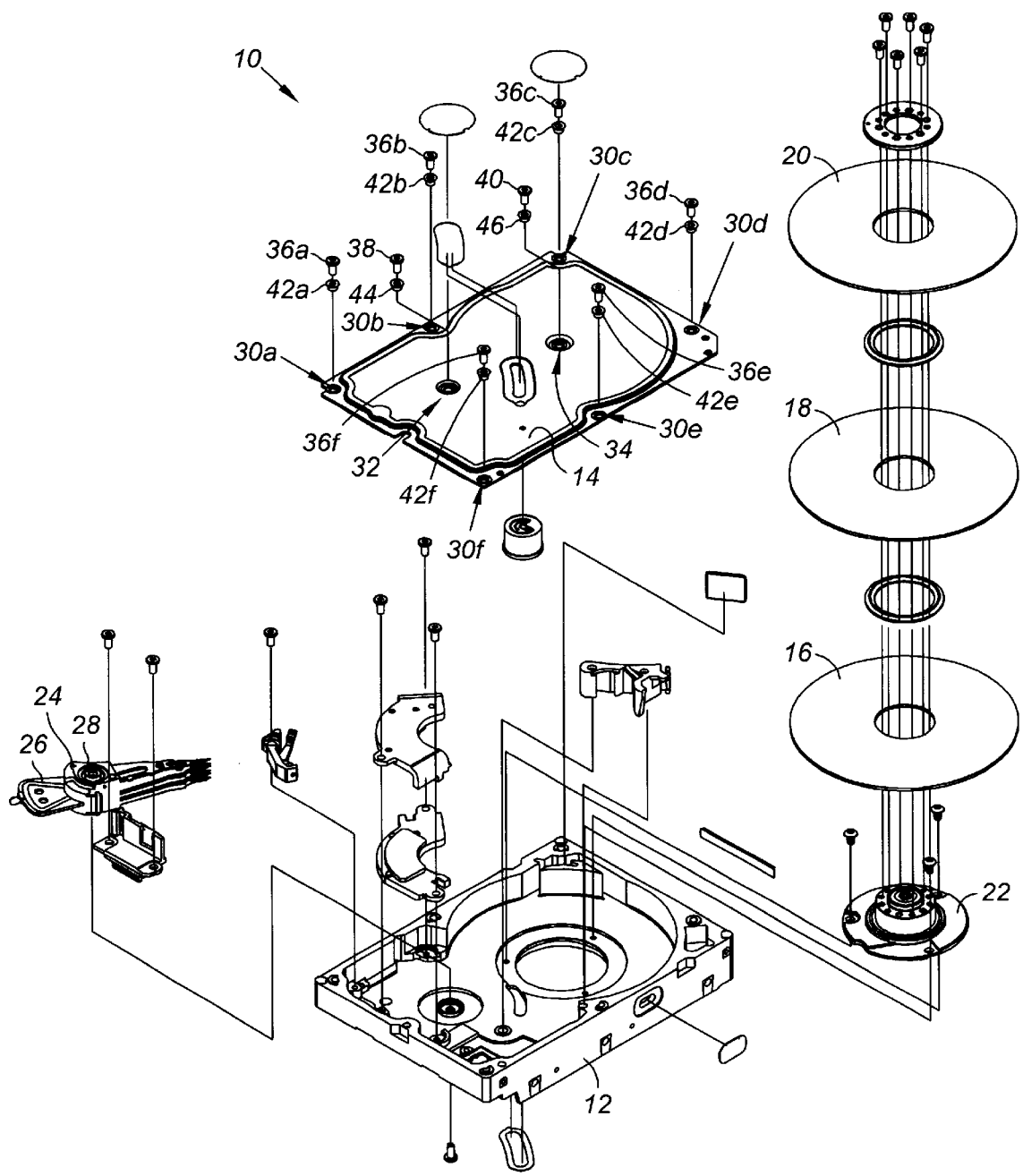
FIG. 1 is an exploded perspective view of a disk drive including a conductive path between a disk drive base and a cover constructed in accordance with aspects of the present invention.

Referring now to the drawings wherein the showings are for purposes of illustrating preferred embodiments of the present invention only, and not for purposes of limiting the same, FIGS. 1–7 illustrate a disk drive 10 in accordance with the aspects of the present invention.

Referring now to FIG. 1 there is depicted an exploded perspective view a disk drive 10 constructed in accordance with an aspect of the present invention. The disk drive 10 includes a head disk assembly (HDA) and a printed circuit board assembly (PCBA). The head disk assembly includes a disk drive base 12 and a cover 14 that collectively house magnetic disks 16, 18, 20. The disks 16, 18, 20 each contain a plurality of tracks for storing data. The head disk assembly further includes a spindle motor 22 for rotating the disks 16, 18, 20. The head disk assembly further includes a head stack assembly 24. The head stack assembly includes a rotatable actuator 26. A pivot bearing cartridge 28 is provided for pivoting the actuator 26 of the head stack assembly 28 relative to the rotating disks 16, 18, 20. The actuator 26 includes a plurality of actuator arms, each actuator arm supporting at least one head gimbal assembly ("HGA"). Each HGA includes a load beam, a gimbal, and a head, which is configured to read/write data from the tracks. Suitably, the head is a magneto-resistive head ("MR head").

Figure 2:
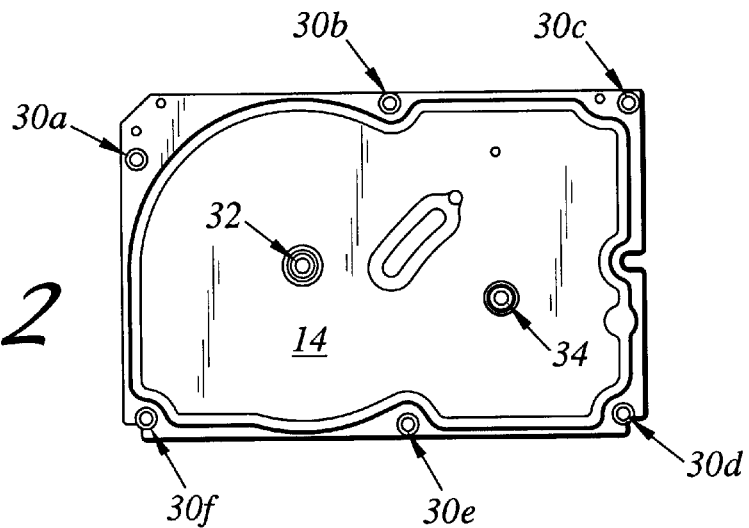
FIG. 2 is an enlarged plan view of the cover.

The cover 14 includes a plurality of fastener openings 30a–f, 32, 34. An enlarged plan view of the cover 14 is shown in FIG. 2. Corresponding to each of the fastener openings 30a–f, 32, 34 are a plurality of fasteners 36a–f, 38, 40, and fastener supports 42a–f, 44, 46. Suitably, the fasteners 36a–f, 38, 40 are conductive screws, such as stainless steel screws. Further, the fastener support 42a–f, 44, 46 are formed of a conductive material, such a stainless steel, aluminum or a silver or carbon filled plastic.

Figure 3:
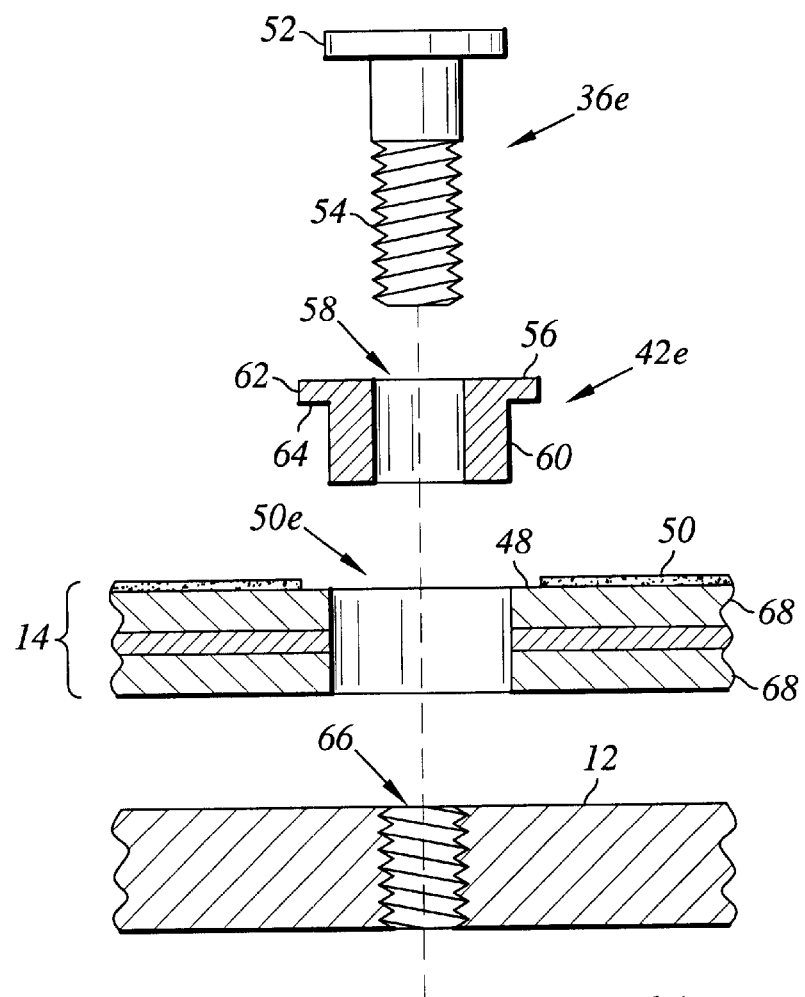
FIG. 3 is an exploded enlarged cross-sectional view of a fastener, a swage nut, a portion of the disk drive base and a portion of the cover as shown in FIG. 1 in accordance with an aspect of the present invention.
Figure 4:
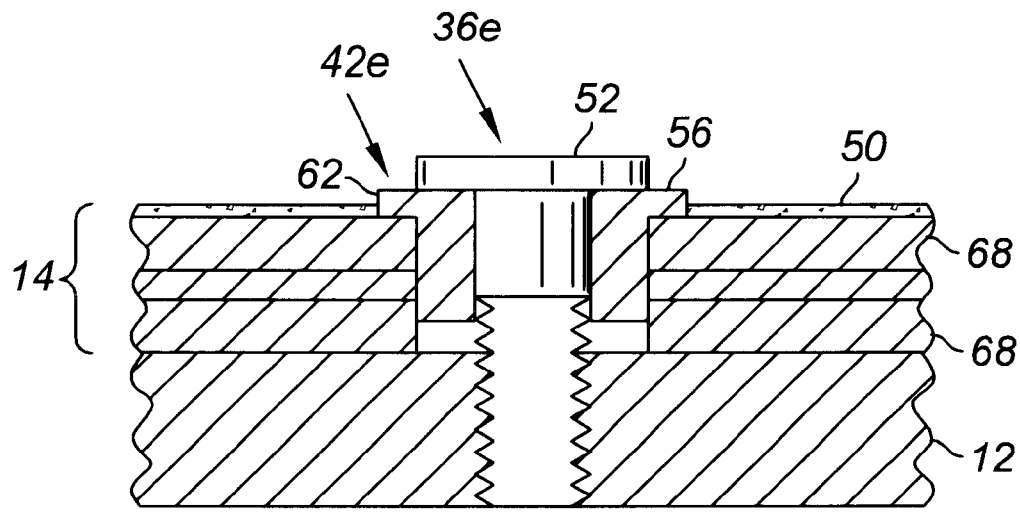
FIG. 4 is an assembled view of the fastener, the swage nut, the portion of the disk drive base and the portion of the cover of FIG. 3.

Referring now additionally to FIG. 3, there is depicted an exploded enlarged cross-sectional view of fastener 36e, fastener support 42e, a portion of the cover 14 and a portion of the disk drive base 12 as shown in FIG. 1. As will be discussed in further detail below, in the embodiment shown, the fastener support 42e takes the form of a swage nut. Further, it is understood that the following discussion is exemplary of the remaining fastener openings 30a–d, f, 32, 34, fasteners 36a–d, f, 38, 40, and fastener supports 42a–d, f, 44, 46. FIG. 4 is an assembled view of fastener 36e, fastener support 42e, a portion of the cover 14 and a portion of the disk drive base 12 as shown in FIG. 3.

An aspect of the invention can be regarded as the disk drive 10 that includes the disk drive base 12 and a cover 14 including a cover outer surface 48 and fastener opening 30e disposed through the cover 14. The disk drive 10 further includes an electrically insulative coating 50 disposed upon the cover outer surface 48. The disk drive 10 further includes fastener 36e, which includes a fastener head 52 and a fastener shaft 54. The disk drive 10 further includes fastener support 42e disposed adjacent to the fastener opening 30e. The fastener support 42e includes a top surface 56 for engaging the fastener head 52. The fastener support 42e includes a central opening 58 sized and configured to receive the fastener shaft 54 through the central opening for mechanically coupling the cover 14 and the disk drive base 12. The disk drive 10 further includes a conductive path disposed between the disk drive base 12 and the cover 14. The conductive path includes the fastener 36e and the fastener support 42e.

As mentioned above, in the embodiment shown, the fastener support 42e takes the form of a swage nut. In this regard, the fastener 42e includes a barrel 60 and a flange 62 extending from the barrel 60. The flange 62 includes a bottom surface 64 disposed opposite the top surface 56 adjacent the cover 14. In particular, the bottom surface 64 is preferably disposed upon the cover outer surface 48. As such, this tends to ensure a conductive contact between the fastener support 42e and the cover 14. As mentioned above, the fastener support 42e includes the top surface 56 for engaging the fastener head 52. In this regard, this tends to ensure conductive contact between the fastener support 42e and the fastener 36e. Conductive contact may further be achieved between the barrel 60 of the fastener support 42e and the cover 14 within fastener opening 30e via the fastener shaft 54 within the barrel 60. In turn, the fastener 36e is engaged with the disk drive base 12, such as via a threaded opening 66, thereby completing a conductive path between the cover 14 and the disk drive base 12.

Advantageously, the usage of the fastener support 42e protects against abrasive contact between the coating 50 and fastener head 52 of the fastener 36e. This avoids particulate generation of the coating 50 which may contaminate the internal environment of the disk drive 10.

The cover 14 may be formed of multiple layers 68 of cold rolled steel and the conductive path may include the multiple layers 68 of cold rolled steel. It is contemplated that the cold rolled steel is a relatively inexpensive material in comparison to other material selections such a stainless steel or aluminum, although such other material selections may be utilized. It is further contemplated that the cover 14 may be machined stamped. Where the cover 14 is formed of the layers 68, each of the layers 68 may be individually stamped and subsequently bonded to form a laminate structure. Use of the cold rolled steel is contemplated to be relative susceptible to corrosion. In this regard, the electrically insulative coating 50 may have corrosion resistant qualities to protect the surface of the cover 14 from oxidation. In a preferred embodiment, the coating 50 is an electro-deposited coating ("E-coating").

Fabrication of the cover 14 with the electrically insulative coating 50 and the fastener support 42e may be effected by various means. For example, the fastener support 42e may initially be installed within the fastener opening 30e. The fastener support 42e, in the form of the swage nut, may undergo a swage operation which involves passing a ball bearing through the central opening 58 thereby expanding the barrel 60 against the interior of the fastener opening 30e for secure engagement. Subsequently, the top surface 56, or at least the portion of the top surface 56 that contacts the fastener head 52, may be masked and the coating 50 be applied to the cover outer surface 48. This may be effected via electro-deposition, a dipping process or a spray process for example. Masking is then removed. Preferably the coating 50 is flush with the fastener support 42e such that the bottom surface 64 of the fastener support 42e and the coating 50 seals the cover outer surface 48.

In another arrangement, the coating 50 may be applied to the cover 14, and the fastener opening 30e is subsequently formed through the coating 50 and the cover 14. The fastener support 42e may then be installed. In this regard, the fastener head 52 is supported by the cover 14 adjacent the fastener opening 30e with the coating 50 between the fastener support 42e and the cover 14. However, as conductive contact may be achieved between the fastener barrel 60 and the cover 14 within fastener opening 30e, a conductive path is formed between the cover 14 and the disk drive base 12 via the fastener shaft 54 with in the barrel 60. In this regard, where multiple layers 68 of the cover 14 are utilized, the barrel 60 of the fastener support 42e may further provide a conductive path between such layers 68 thereby grounding the same.

There are a variety of fasteners 36a–f, 32, 34 that may be disposed about the cover 14 for attachment of the cover 14 and the disk drive base 12. Fasteners 36a–f are directly engage with the disk drive base 12. For example, fastener 36e is engaged with the threaded opening 66 that is formed in the disk drive base 12. Fastener 32 is engaged to the pivot bearing cartridge 28 within the disk drive 10 for mechanically coupling the cover 14 and the disk drive base 12. Further, fastener 34 is engaged to the spindle motor 22 within the disk drive 10 for mechanically coupling the cover 14 and the disk drive base 12.

Figure 5:
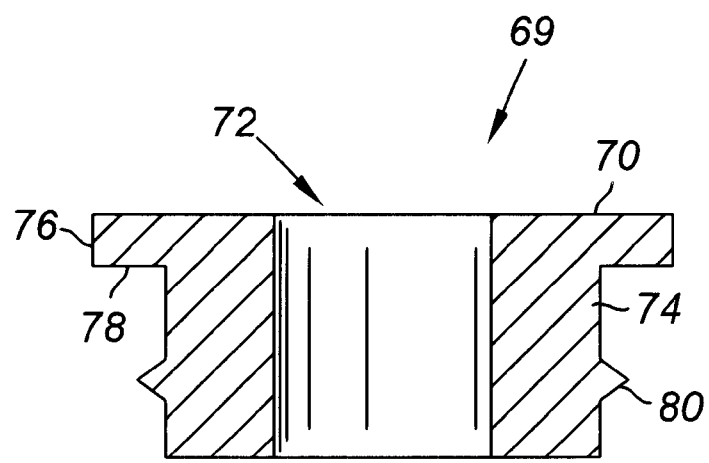
FIG. 5 is a cross-sectional view of another embodiment of a swage nut according to another aspect of the present invention.

Referring now to FIG. 5, according to another embodiment of the fastener supports 42a–f, 44, 46 of FIGS. 1, 3 and 5, there is depicted a cross-sectional view of fastener support 69. Like fastener supports 42a–f, 44, 46, fastener support 69 also takes the form of a swage nut. Fastener support 69 is similar in configuration to fastener supports 42a–f, 44, 46 and includes a top surface 70, a barrel 74 extending from a flange 76, and a bottom surface 78. The barrel 74, however, includes a protrusion 80 for engaging the cover 14 within the fastener opening 30e. While the protrusion 80 is depicted to be radially aligned in a ring-like manner, other configurations may be utilized such a plurality of portions which are longitudinally aligned about the barrel 74. The protrusion 80 tends to ensure conductive contact between the fastener support 69 and the cover 14 within the fastener opening 30e. Further, where the cover 14 includes the fastener opening 30e prior to application of the coating 50, the coating 50 may further cover the interior surface of the opening 30e. Utilization of the protrusion 80 may be used to cut through the coating 50 for providing the conductive path between the cover 14 and the disk drive base 12. Where the cover 14 is formed of the multiple layers 68, the in conductive path may include the protrusion 80 and the multiple layers 68.

Figure 6:
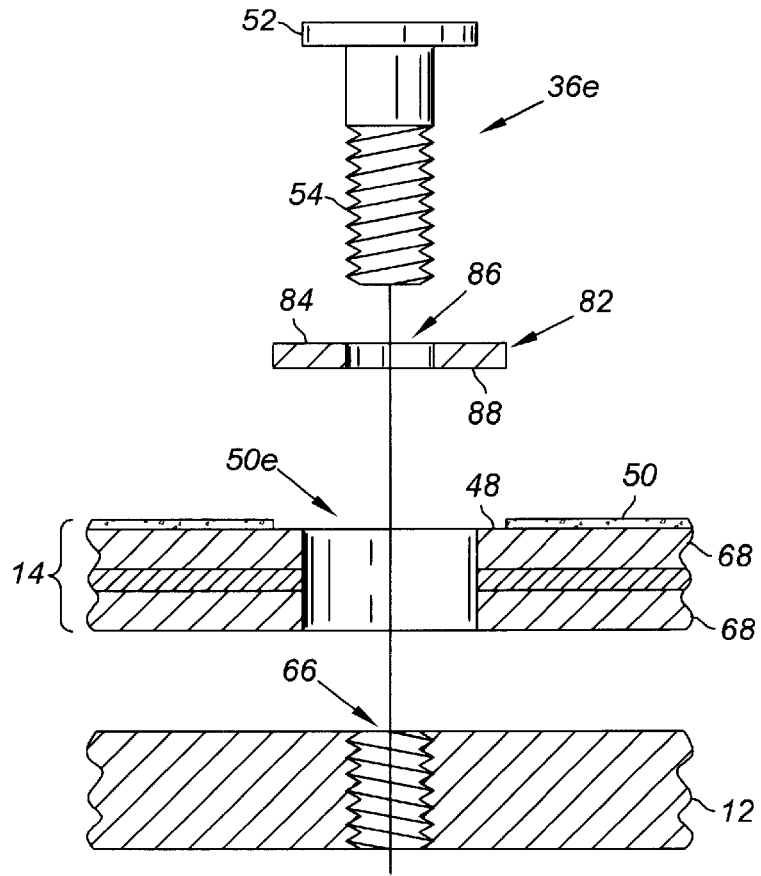
FIG. 6 is an exploded enlarged cross-sectional view of a fastener, a washer, the disk drive base and the cover as shown in FIG. 1 in accordance with an aspect of the present invention.
Figure 7:
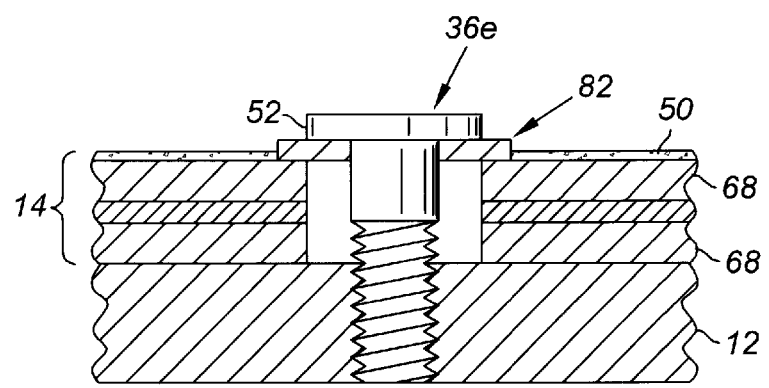
FIG. 7 is an assembled view of the fastener, the washer, the portion of the disk drive base and the portion of the cover of FIG. 6.

Referring now to FIG. 6, there is depicted a fastener support 82 according to another embodiment in the form of a washer. FIG. 6 is similar to FIG. 3, however, with the substitution of fastener support 82 in place of fastener support 42e. FIG. 7 is an assembled view of fastener 36e, fastener support 82, a portion of the cover 14 and a portion of the disk drive base 12 as shown in FIG. 6. The fastener support 82 includes a top surface 84, an opposing bottom surface 88, and a central opening formed through the fastener support 82. The fastener support 82 is installed about the fastener opening 30e with the bottom surface 88 is disposed upon the cover 14. In this regard, it is contemplated that electrically insulative coating 50 is not disposed between the cover outer surface 48 and the bottom surface 88. The bottom surface may be attached to the cover 14 with an electrically conductive adhesive. This provides a conductive path between the bottom surface 88 and the cover outer surface 48. Alternatively, the fastener support 82 may be soldered or brazed to the cover 14 for example.

We claim:

1. A disk drive comprising:

a disk drive base;

a cover including a cover outer surface and a fastener opening disposed through the cover;

an electrically insulative coating disposed upon the cover outer surface;

a fastener including a fastener head and a fastener shaft;

a fastener support in the form of a swage nut, the fastener support being disposed adjacent to the fastener opening, the fastener support including a top surface for engaging the fastener head, the fastener support including a central opening sized and configured to receive the fastener shaft through the central opening for mechanically coupling the cover and the disk drive base; and a conductive path disposed between the disk drive base and the cover, the conductive path including the fastener and the fastener support.

2. The disk drive of claim 1 wherein the cover is formed of cold rolled steel.

3. The disk drive of claim 2 wherein the cover is formed of multiple layers of cold rolled steel.

4. The disk drive of claim 3 wherein the conductive path includes the multiple layers of cold rolled steel.

5. The disk drive of claim 1 wherein the fastener support includes a barrel and a flange extending from the barrel, the flange includes a bottom surface disposed opposite the top surface adjacent the cover.

6. The disk drive of claim 5, wherein the barrel includes a protrusion for engaging the cover within the fastener opening.

7. The disk drive of Claim 6 wherein the cover is formed of multiple layers, the conductive path includes the protrusion and the multiple layers.

8. The disk drive of claim 1 wherein the fastener is directly engaged with the disk drive base.

9. The disk drive of claim 1 wherein the fastener is engaged to a pivot bearing cartridge within the disk drive for mechanically coupling the cover and the disk drive base.

10. The disk drive of claim 1 wherein the fastener is engaged to a spindle motor within the disk drive for mechanically coupling the cover and the disk drive base.

* * * * *